US008453128B2

(12) United States Patent
Daynes et al.

(10) Patent No.: US 8,453,128 B2
(45) Date of Patent: May 28, 2013

(54) METHOD AND SYSTEM FOR IMPLEMENTING A JUST-IN-TIME COMPILER

(75) Inventors: Laurent Daynes, Saint-Ismier (FR); Bernd J. Mathiske, Sunnyvale, CA (US); Gregory M. Wright, Mountain View, CA (US); Mario I. Wolczko, San Carlos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1642 days.

(21) Appl. No.: 11/864,847

(22) Filed: Sep. 28, 2007

(65) Prior Publication Data

US 2009/0089767 A1    Apr. 2, 2009

(51) Int. Cl.
G06F 9/44    (2006.01)
(52) U.S. Cl.
USPC ............ 717/148; 717/140; 717/152; 717/153
(58) Field of Classification Search
USPC ........................................................ 717/148
See application file for complete search history.

(56) References Cited

U.S. PATENT DOCUMENTS

| 6,110,226 | A * | 8/2000 | Bothner | 717/153 |
| 2003/0145312 | A1 * | 7/2003 | Bates et al. | 717/152 |
| 2005/0010911 | A1 * | 1/2005 | Kim et al. | 717/140 |

OTHER PUBLICATIONS

John Whaley, Joeq: A Virtual Machine and Compiler Infrastructure, Jun. 12, 2003.*
Burke et al, The Jalapeño Dynamic Optimizing Compiler for JavaTM, 1999.*
Bershad, B., et al., NGVM Think Tank Meeting Notes,http://moxie.sourceforge.net/meetings/20051206/summary.html, Dec. 6-7, 2005, 4 pages.

* cited by examiner

*Primary Examiner* — Li B Zhen
*Assistant Examiner* — Lenin Paulino
(74) *Attorney, Agent, or Firm* — Osha Liang LLP

(57) ABSTRACT

A method for implementing a just-in-time compiler involves obtaining high-level code templates in a high-level programming language, where the high-level programming language is designed for compilation to an intermediate language capable of execution by a virtual machine, and where each high-level code template represents an instruction in the intermediate language. The method further involves compiling the high-level code templates to native code to obtain optimized native code templates, where compiling the high-level code templates is performed, prior to runtime, using an optimizing static compiler designed for runtime use with the virtual machine. The method further involves implementing the just-in-time compiler using the optimized native code templates, where the just-in-time compiler is configured to substitute an optimized native code template when a corresponding instruction in the intermediate language is encountered at runtime.

17 Claims, 3 Drawing Sheets

METHOD AND SYSTEM FOR IMPLEMENTING A JUST-IN-TIME COMPILER

BACKGROUND

Many different computer system architectures exist. Examples of computer system architectures include Intel Architecture 32 by Intel Corporation and AMD64 by Advanced Micro Devices, Inc. (AMD). Computer system architectures are typically differentiated by their instruction set architecture, i.e., the native instructions supported by the central processing unit (CPU). Instructions written for a particular instruction set architecture are generally not directly compatible with other instruction set architectures.

Because different computer system architectures exist, software developers were historically required to rewrite software for each instruction set architecture. However, with time, technologies have evolved that help reduce the amount of effort required to port software from one instruction set architecture to another instruction set architecture. For example, the C programming language is relatively standard across different instruction set architecture implementations. However, software written in the C programming language must still be modified and recompiled for each instruction set architecture.

In more recent years, virtual machines have increased in popularity. Virtual machines are instruction set architecture-specific runtime environments designed to execute software compiled in an intermediate language. The intermediate language is relatively consistent across implementations of the virtual machine. Therefore, software that is compiled into the intermediate language can be distributed to any instruction set architecture for which the appropriate virtual machine has been implemented. Examples of virtual machines include the Java® Virtual Machine (JVM), the Microsoft .NET® Common Language Runtime (CLR), and variants thereof. Java® is a registered trademark of Sun Microsystems, Inc., located in Palo Alto, Calif. Microsoft .NET® is a registered trademark of Microsoft, Inc., located in Redmond, Wash.

Although virtual machines increase portability of software, there is computing overhead associated with using the intermediate language. Specifically, as instructions in the intermediate language are encountered at runtime, the instructions must be converted to native instructions by the virtual machine. In contrast, software compiled directly to native instructions does not incur this overhead.

To mitigate the overhead associated with using an intermediate language, some virtual machines use a just-in-time compiler. Typically, virtual machines that use runtime compilation operate as follows. An initial translation of the intermediate code into native instructions is performed using a relatively simple just-in-time compiler. The compilation is performed quickly, but often does not result in high-performance code. Therefore, the compiled code is instrumented during execution to provide information about "hot spots," i.e., code paths that are executed frequently. Once identified, the "hot" code paths are recompiled by the virtual machine using a second, optimizing compiler. The optimizing compiler is slower than the just-in-time compiler that performed the initial translation, but generates higher quality (i.e., faster executing) native instructions.

Further, meta-circular virtual machines are virtual machines written in the same high-level language whose execution they support (e.g., a Java® virtual machine written in the Java® programming language). Developing a meta-circular virtual machine requires a static optimizing compiler to produce an efficient image of the virtual machine. The optimizing compiler used to build the meta-circular virtual machine may also be incorporated in the virtual machine image and used as a runtime optimizing compiler.

For a just-in-time compiler to function properly, native code templates must be present for each of the instructions in the intermediate language. These native code templates are typically created manually for each supported architecture. Therefore, porting a just-in-time compiler to a new instruction set architecture typically requires a large amount of manual effort. Because of this effort, many ports of virtual machines do not include a just-in-time compiler.

SUMMARY

In general, in one aspect, the invention relates to a method for implementing a just-in-time compiler. The method comprises obtaining a plurality of high-level code templates in a high-level programming language, wherein the high-level programming language is designed for compilation to an intermediate language capable of execution by a virtual machine, and wherein each high-level code template selected from the plurality of high-level code templates represents an instruction in the intermediate language. The method further comprises compiling the plurality of high-level code templates to native code to obtain a plurality of optimized native code templates, wherein compiling the plurality of high-level code templates is performed, prior to runtime, using an optimizing static compiler designed for runtime use with the virtual machine. The method further comprises implementing the just-in-time compiler using the plurality of optimized native code templates, wherein the just-in-time compiler is configured to substitute an optimized native code template selected from the plurality of optimized native code templates when a corresponding instruction in the intermediate language is encountered at runtime.

In general, in one aspect, the invention relates to a computer system. The computer system comprises a virtual machine configured to execute instructions in an intermediate language, an optimizing static compiler adapted for runtime use with the virtual machine, and a plurality of high-level code templates in a high-level programming language, wherein the high-level programming language is designed for compilation to the intermediate language, and wherein each high-level code template selected from the plurality of high-level code templates represents an instruction in the intermediate language. The computer system further comprises a software development environment configured to compile the plurality of high-level code templates to native code to obtain a plurality of optimized native code templates prior to runtime, and implement a just-in-time compiler using the plurality of optimized native code templates, wherein the just-in-time compiler is configured to substitute an optimized native code template selected from the plurality of optimized native code templates when a corresponding instruction in the intermediate language is encountered at runtime.

In general, in one aspect, the invention relates to a system. The system comprises means for obtaining a plurality of high-level code templates in a high-level programming language, wherein the high-level programming language is designed for compilation to an intermediate language capable of execution by a virtual machine, and wherein each high-level code template selected from the plurality of high-level code templates represents an instruction in the intermediate language. The system further comprises means for compiling the plurality of high-level code templates to native code to obtain a plurality of optimized native code templates, wherein compiling the plurality of high-level code templates is performed, prior to runtime, using an optimizing static compiler designed for runtime use with the virtual machine. The system further comprises means for implementing the just-in-time compiler using the plurality of optimized native code templates, wherein the just-in-time compiler is configured to substitute an optimized native code template selected from the plurality of optimized native code templates when a corresponding instruction in the intermediate language is encountered at runtime.

Other aspects of the invention will be apparent from the following description and the appended claims.

DETAILED DESCRIPTION

Figure 1:
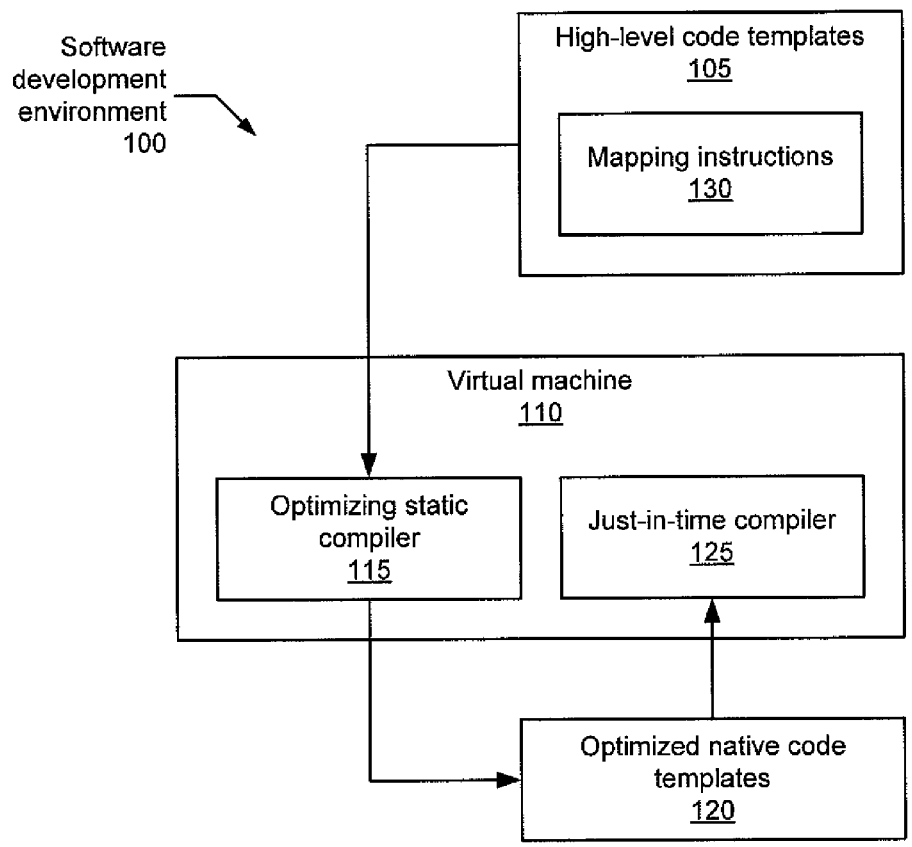
FIG. 1 shows a diagram of a software development environment in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for implementing a just-in-time compiler. In high-performance and meta-circular virtual machines, an optimizing compiler for the supported high-level language is already available. In one or more embodiments of the invention, the existing optimizing compiler is leveraged to implement a just-in-time compiler that favors speed of compilation over code quality, reducing the amount of instruction set-specific code that must be manually written for the just-in-time compiler.

Specifically, in one or more embodiments of the invention, a fast just-in-time compiler is implemented using a template-based approach. A template is a sequence of native instructions that implements the logic of an intermediate instruction. In a template-based approach, the just-in-time compiler maintains one or more optimized native code templates for each instruction in the intermediate language. At runtime, the just-in-time compiler compiles intermediate instructions as they are encountered, by emitting copies of the corresponding native templates into memory.

Further, in one or more embodiments, the logic of the template-based just-in-time compiler is architecture neutral (i.e., not designed for a specific instruction set architecture), and may be written entirely in a platform independent high-level programming language. Thus, only the code of the native code templates themselves depends heavily on a specific instruction set. In one or more embodiments of the invention, the templates are written instead in the same high-level language that is compiled into instructions of the intermediate language. Then, the existing optimizing compiler is used to automatically produce optimized native code templates. In one or more embodiments, the optimizing compiler also produces instruction set architecture-specific instruction editors that may be needed by the just-in-time compiler to modify copies of the optimized native code templates at runtime. Thus, one or more embodiments of the invention significantly decrease the large amount of tedious and error-prone manual effort typically required to write native code templates.

FIG. 1 shows a diagram of a software development environment (100) in accordance with one or more embodiments of the invention. Specifically, the software development environment (100) is configured to implement a just-in-time compiler (125). The software development environment (100) may include many different types of software development tools (not shown), such as an integrated development environment (IDE), a command-line interpreter (CLI), one or more compilers, and/or a graphical user interface (GUI).

In one or more embodiments, the software development environment (100) includes a virtual machine (110). As discussed above, the virtual machine (110) is configured to execute instructions in an intermediate language. Specifically, the virtual machine (110) includes an optimizing static compiler (115) configured to compile instructions in the intermediate language to native instructions at runtime.

In one or more embodiments, the optimizing static compiler (115) includes optimizations to improve performance once classes have been compiled. Specifically, the optimizing static compiler (115) is configured to load entire sets of instructions (e.g., classes or packages) and use optimization algorithms on the sets of instructions to generate optimized native code. While the native code generated in this manner may be of higher quality (i.e., faster executing) than instructions loaded one at a time, these sorts of optimizations typically incur additional processing overhead. For example, users may experience a pause the first time a class file is encountered, as the optimizing static compiler (115) compiles the entire class file. In other words, using the optimizing static compiler (115) typically requires a trade-off between load time and subsequent execution time.

As noted above, many ports of virtual machines do not include a just-in-time compiler. However, in one or more embodiments of the invention, the software development environment (100) is configured to use the optimizing static compiler (115) to implement the just-in-time compiler (125). In one or more embodiments, the just-in-time compiler (125) is implemented using a template-based approach. Specifically, high-level code templates (105) are written and compiled to optimized native code templates (120). Each of the high-level code templates (105), and the resulting optimized native code templates (120), corresponds to a particular intermediate instruction. At runtime, the just-in-time compiler (125) is configured to produce copies of the optimized native code templates (120) as the corresponding intermediate instructions are encountered. Implementation of the just-in-time compiler (125) is discussed in detail below.

In one or more embodiments, the software development environment (105) is configured to store the high-level code templates (105). Specifically, in one or more embodiments of the invention, a software developer uses the software development environment (105) to write the high-level code templates (105) in a high-level programming language. The high-level code templates (105) written by the software developer are then stored by the software development environment (105). As noted above, in one or more embodiments, each of the high-level code templates (105) corresponds to an instruction in the intermediate language used by the virtual machine (110).

Further, in one or more embodiments, the high-level code templates (105) include mapping instructions (130). The mapping instructions (130) provide abstraction for native registers and stack manipulation for the instruction set architecture for which the virtual machine (110) is implemented. If the high-level programming language does not typically include instructions to manipulate registers or the stack, the mapping instructions (130) may be implemented as extensions to the high-level programming language. Specifically, in one or more embodiments, the software development environment (100) is configured to extend the optimizing static compiler (115) to include support for compiling the mapping instructions (130).

Table 1 shows an example of a high-level code template in accordance with one or more embodiments of the invention. Specifically, the example shown in Table 1 is written in Java® and corresponds to the Java® bytecode instruction "aload_0."

TABLE 1

High-level code template corresponding to aload_0

```
public void aload_0( ) {
    Object value = JavaLocals.readReferenceAt(0);
    JavaStack.incrementStackPointer(STACK_SLOT_SIZE);
    JavaStack.writeReferenceAt(0, value);
}
```

In Table 1, the classes JavaLocals and JavaStack are classes that abstract the stack frame and operand stack of the current method activation. Specifically, the mapping instructions "readReferenceAt," "writeReferenceAt," and "incrementStackPointer" provide abstraction for manipulating the native stack (where STACK_SLOT_SIZE is a constant indicating the size of each memory slot in the stack). Those skilled in the art will appreciate that Table 1 is provided for exemplary purposes only and should not be construed as limiting the scope of the invention.

In one or more embodiments, multiple high-level code templates (105) may be provided for the same intermediate instruction. For example, the high-level code templates (105) may include different templates for classes that are resolved at compile-time and classes that are resolved at runtime. These classes are referred to as "resolved" and "unresolved," respectively.

Table 2 shows another example of a high-level code template in accordance with one or more embodiments of the invention. Specifically, the example shown in Table 2 corresponds to the Java® bytecode instruction "getfield," when the instruction is used with a resolved class.

TABLE 2

High-level code template for "getfield" (resolved class)

```
public void getfield( ) {
    final ResolvedAtCompileTime obj =
        JavaStack.readResolvedObjRefAt(0);
    JavaStack.writeIntAt(0, obj._intField);
}
```

Similarly, Table 3 shows an example of a high-level code template corresponding to the Java® bytecode instruction "getfield," when the instruction is used with an unresolved class.

TABLE 3

High-level code template for "getfield" (unresolved class)

```
public void getfield( ) {
    final UnresolvedAtCompileTime obj =
        JavaStack.readUnresolvedObjRefAt(0);
    JavaStack.writeIntAt(0, obj._intField);
}
```

The high-level code templates shown in Table 2 and Table 3 differ in the specific mapping instructions used. Further, different mapping instructions may compile to very different sets of native instructions. Compiled versions of the high-level code templates shown in Table 2 and Table 3 are discussed below. Those skilled in the art will appreciate that Table 2 and Table 3 are provided for exemplary purposes only and should not be construed as limiting the scope of the invention.

Continuing with discussion of FIG. 1, in one or more embodiments, the software development environment (100) is configured to use the optimizing static compiler (115) to compile the high-level code templates (105). Specifically, the optimizing static compiler (115) is used to compile the high-level code templates (105) to optimized native code templates (120).

Further, in one or more embodiments, the software development environment (100) is configured to annotate the optimized native code templates (120) for use with the just-in-time compiler (125). Annotations are discussed in detail below with respect to FIG. 2. The annotations may be made during the initial compilation by the optimizing static compiler (115), or may be made after the optimized native code templates (120) are generated.

In one or more embodiments, the software development environment (100) is configured to implement the just-in-time compiler (125) using the optimized native code templates (120). Specifically, when the just-in-time compiler (125) is implemented, the optimized native code templates (120) are packaged with the just-in-time compiler (125). The just-in-time compiler (125) is configured to use copies of the optimized native code templates (120) as substitutes for the corresponding intermediate instructions. Specifically, in one or more embodiments, the just-in-time compiler (125) is configured to use a copy of the appropriate template from the optimized native code templates (120) based on contextual information available at runtime (e.g., whether a class is resolved or unresolved). Further, in one or more embodiments, the just-in-time compiler (125) is configured to process annotations in the optimized native code templates (120) and customize copies of the optimized native code templates (120) at runtime according to the annotations. Annotations are discussed in detail below.

Figure 2:
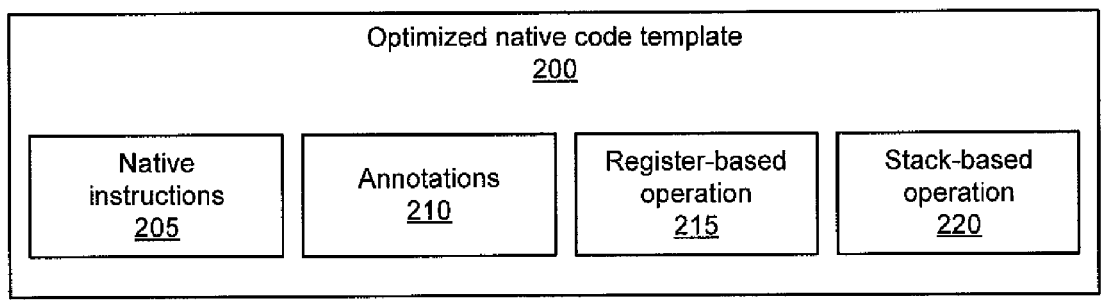
FIG. 2 shows an expanded diagram of an optimized native code template in accordance with one or more embodiments of the invention.

FIG. 2 shows an expanded diagram of an optimized native code template (200) in accordance with one or more embodiments of the invention. The optimized native code template (200) includes native instructions (205), i.e., instructions that are compatible with the instruction set architecture for which the virtual machine (e.g., virtual machine (110) of FIG. 1) is implemented.

Further, in one or more embodiments, the optimized native code (200) includes annotations (210). Specifically, the annotations (210) are parts of the optimized native code template (200) indicating constants whose values may need to be modified during runtime compilation of intermediate code by the just-in-time compiler. Said another way, the annotations (210) indicate dependencies on the runtime context in which the constants are used.

For example, an instruction to load a field in an object may be dependent on the memory offset of the field. This memory offset may vary from one object to the next, and from one execution to the next. Accordingly, the memory offset may be annotated so that the just-in-time compiler (e.g., just-in-time compiler (125) of FIG. 1) knows to modify the value of the constant. Examples of constants that may require runtime modification include atomic type values (e.g., integer offsets to fields of objects, virtual method dispatch table indices, or literal constants) and literal references to objects (e.g., references to runtime representations of classes, to statically linked methods, or to objects implementing resolution guards).

Table 4 shows an example of an optimized native code template in accordance with one or more embodiments of the invention. Specifically, the example in Table 4 shows an optimized native code template compiled from the high-level code template shown in Table 2, i.e., the resolved case of the intermediate instruction "getfield."

TABLE 4

Optimized native code template for "getfield" (resolved class)

0 mov rax, [rsp + 0]
5 mov eax, [rax + 36]
8 mov [rsp + 0], eax

Similarly, Table 5 shows an example of an optimized native code template compiled from the high-level code template shown in Table 3, i.e., the unresolved case of the intermediate instruction "getfield."

TABLE 5

Optimized native code template for "getfield" (unresolved class)

Figure 4:
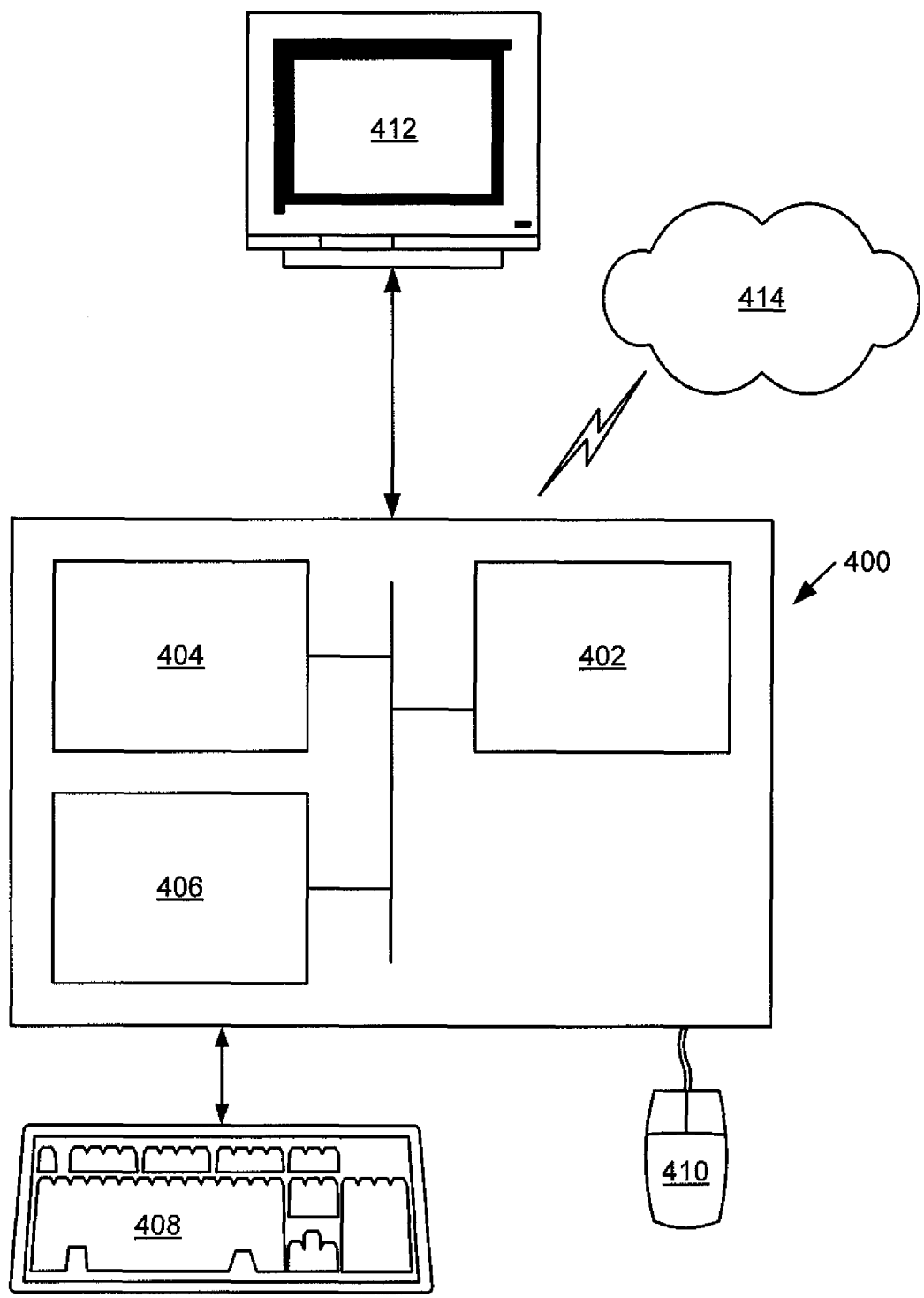
FIG. 4 shows a diagram of a computer system in accordance with one or more embodiments of the invention.

00 mov rcx, [rsp + 0]
05 mov rax, [−52]
12 mov rax, [rax + 12]
16 xor rdx, rdx
19 cmp rax, rdx
22 jz L1: +13
24 mov rax, [−71]
31 mov rax, [rax + 12]
35 jmp L2: +44
37 L1: mov [rbp], rcx
41 mov rax, [−88]
48 mov rdi, rax
51 mov rax, [−90]
58 mov rsi, rax
61 call
 <com.sun.max.jvm.compiler.snippet.ResolutionSnippet$
  ResolveDynamicFieldForReadin.resolve(ReferenceResolution
  Guard guard, FieldRefConstant c)>
66 mov rcx, [rbp]
70 mov rax, [−117]
77 mov rax, [rax + 12]
81 L2: mov eax, [rax + 84]
84 mov eax, rcx[rax]
87 mov [rsp + 0], eax The optimized native code template shown in Table 5 is much longer than the optimized native code template shown in FIG. 4, because in the case of an unresolved class, instructions are required to load the class, resolve the link to the referenced object field, and determine the offset of the field. Those skilled in the art will appreciate that offsets in resolved classes do not require this sort of resolution, because the offset is already known at compile-time.

In the example shown in Table 4, the instruction at line 5 is annotated with a dependency for a field offset constant. Specifically, the annotation indicates that the immediate operand of value 36 of the native "mov" instruction corresponds to a field offset. The annotation is associated with an instruction editor configured to replace the value of the immediate operand in the copy of the optimized native code template ultimately used by the just-in-time compiler. Instruction editors are discussed in detail below.

In one or more embodiments, the just-in-time compiler does not include functionality to modify the "mov" instruction itself. Rather, the just-in-time compiler simply modifies the copy of the optimized native code template via the abstraction provided by the instruction editor, as instructed by the annotation. In this manner, the use of annotations helps the just-in-time compiler remain platform-agnostic, i.e., to avoid having to know details of the instructions in the specific instruction set architecture.

Continuing with discussion of FIG. 2, in one or more embodiments, each of the annotations (210) is associated with an instruction editor (not shown). In one or more embodiments, the instruction editor is a set of instructions in the just-in-time compiler designed to modify a constant as discussed above. In one or more embodiments of the invention, different instruction editors are provided for each type of offset modification that may be required. The specific type of annotation used indicates which instruction editor to use.

Figure 3:
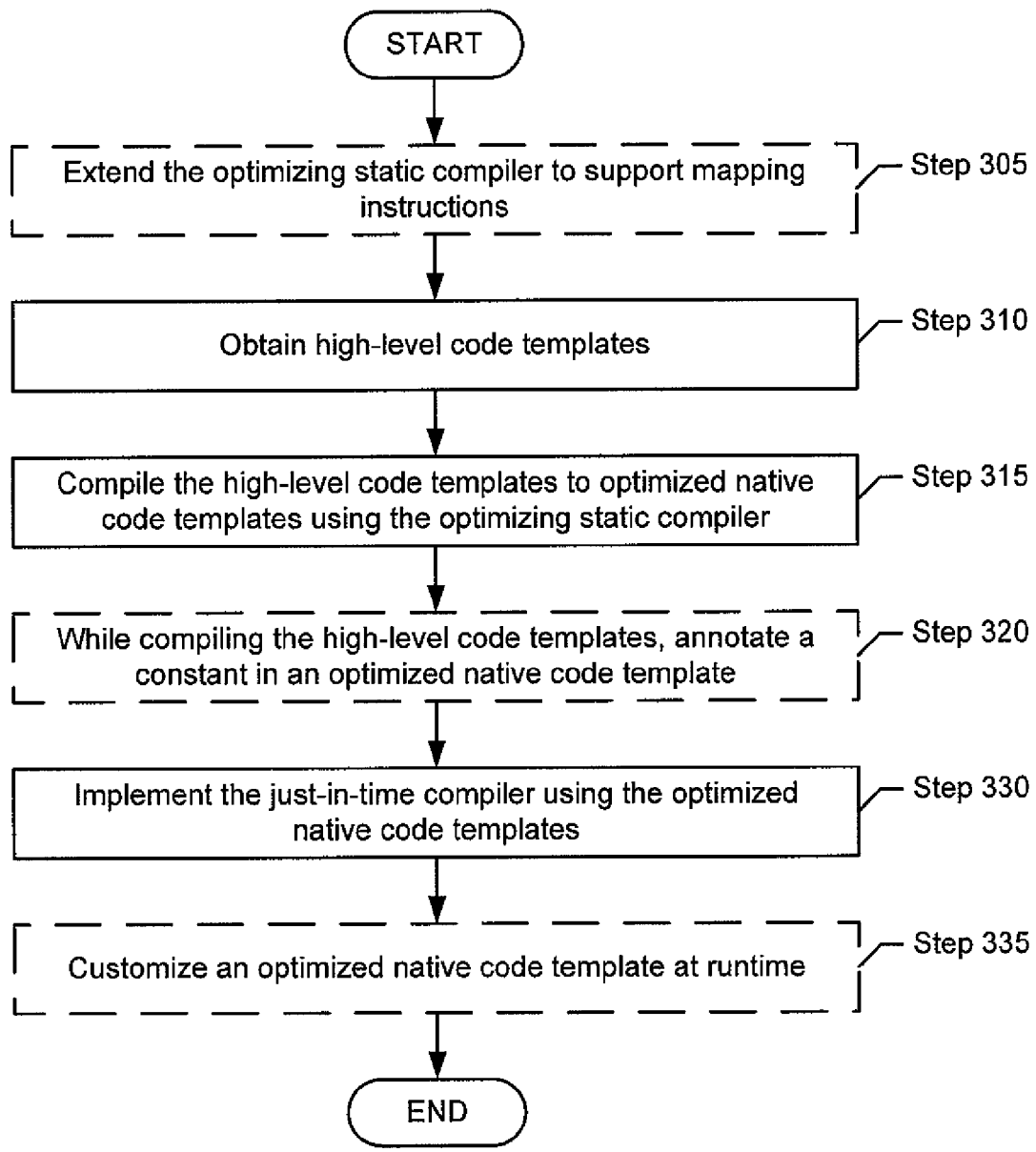
FIG. 3 shows a flowchart of a method for implementing a just-in-time compiler in accordance with one or more embodiments of the invention.

FIG. 3 shows a flowchart of a method for implementing a just-in-time compiler in accordance with one or more embodiments of the invention. In one or more embodiments of the invention, one or more of the steps shown in FIG. 3 may be omitted, repeated, and/or performed in a different order than the order shown in FIG. 3. Accordingly, the specific ordering of steps shown in FIG. 3 should not be construed as limiting the scope of the invention.

As noted above, mapping instructions may be used to provide abstraction to registers and stack functions of the underlying instruction set architecture. Accordingly, in Step 305, the optimizing static compiler may be extended to support the mapping instructions. Specifically, the optimizing static compiler may be extended with functionality to compile the mapping instructions to the corresponding native instructions.

In Step 310, high-level code templates are obtained. Specifically, the high-level code templates that are obtained are written in a high-level programming language designed to be compiled to an intermediate language. For example, Java® is a high-level programming language designed to be compiled to JVM bytecode. Similarly, C# is a programming language designed to be compiled to CLR bytecode. Each of the high-level code templates corresponds to a particular instruction in the intermediate language. Further, the high-level code templates may include mapping instructions.

In Step 315, the high-level code templates are compiled to optimized native code templates. Specifically, the high-level code templates are compiled using an optimizing static compiler. As noted above, the optimizing static compiler is configured to optimize the native instructions it generates. The optimized native code templates include native instructions, copies of which may be substituted for intermediate instructions at runtime by the just-in-time compiler.

As noted above, the optimized native code templates may require some modifications prior to implementing the just-in-time compiler. For example, in Step 320, a constant in an optimized native code template may be annotated to indicate that the constant may change at runtime. As discussed above, the annotation identifies the constant and may further be associated with a specific instruction editor. For example, an immediate operand in a native instruction of the optimized native code template may be annotated to indicate that the instruction's value depends on the value of the operands of the corresponding intermediate code instruction, In other words, the value of the native instruction may depend on values that are determined at runtime.

Further, as discussed above, the annotation of the template may be associated with an instruction editor, and the just-in-time compiler may be configured to use the instruction editor to modify a copy of the optimized native code template. In one or more embodiments, annotations are added to the optimized native code templates when the optimized native code templates are compiled by the optimizing static compiler. Thus, Step 320 may be thought of as a component of Step 315, described above.

In Step 330, the just-in-time compiler is implemented using the optimized native code templates. Specifically, the just-in-time compiler is configured to substitute copies of the optimized native code templates for instructions in the intermediate language that are encountered at runtime. Further, in one or more embodiments, the just-in-time compiler is implemented with functionality to identify annotated constants and modify the constants accordingly (e.g., by invoking an associated instruction editor). Specifically, in Step 335, the just-in-time compiler customizes an optimized native code template at runtime, when an annotation is encountered.

In one or more embodiments of the invention, implementing a just-in-time compiler as discussed herein helps reduce the amount of effort required to port the just-in-time compiler to new computer system architectures. Specifically, because the optimizing static compiler is always included with the virtual machine, existing functionality of the optimizing static compiler may be used to generate the native instructions of the templates used during just-in-time compilation. Thus, embodiments of the invention reduce the amount of manual, architecture-specific software development associated with porting just-in-time compilers.

Further, in one or more embodiments, the implementation method described herein reduces dependence on other programming languages being implemented for the target instruction set architecture. That is, in one or more embodiments of the invention, the ability to port the just-in-time compiler to a particular instruction set architecture does not depend on the presence of a particular programming language—only that the virtual machine, optimizing static compiler, and any necessary extensions be implemented for the target instruction set architecture.

Embodiments of the invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a network (414) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., high-level code templates, virtual machine, optimizing static compiler, optimized native code templates, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing a just-in-time compiler, comprising:
   obtaining a plurality of high-level code templates in a high-level programming language,
      wherein the high-level programming language is designed for compilation to an intermediate language capable of execution by a virtual machine, and
      wherein each high-level code template selected from the plurality of high-level code templates represents an instruction in the intermediate language;
   compiling the plurality of high-level code templates to native code to obtain a plurality of optimized native code templates,
      wherein compiling the plurality of high-level code templates is performed, prior to runtime, using an optimizing static compiler designed for runtime use with the virtual machine;
   marking a constant in an optimized native code template selected from the plurality of optimized native code templates with an annotation, wherein the annotation indicates that the constant requires modification by the just-in-time compiler at runtime; and
   implementing the just-in-time compiler using the plurality of optimized native code templates, wherein the just-in-time compiler is configured to substitute a copy of an optimized native code template selected from the plurality of optimized native code templates when a corresponding instruction in the intermediate language is encountered at runtime.

2. The method of claim 1, further comprising:
   extending the optimizing static compiler to support a plurality of mapping instructions in the high-level programming language,
      wherein the plurality of mapping instruction provides access to native registers and stack manipulation functions, and
      wherein a high-level code template selected from the plurality of high-level code templates comprises a mapping instruction selected from the plurality of mapping instructions.

3. The method of claim 1, wherein the annotation is associated with an instruction editor, and wherein the just-in-time compiler is further configured to modify the constant, using the instruction editor, at runtime.

4. The method of claim 3, further comprising:
encountering the annotation at runtime; and
executing the instruction editor based on encountering the annotation, wherein executing the instruction editor comprises modifying the constant based on a runtime context of the constant.

5. The method of claim 1, wherein the constant is one selected from the group consisting of an offset to a field of an object, an index into a virtual method dispatch table, a literal constant, a reference to a runtime representations of a class, and a reference to a statically linked method.

6. The method of claim 1, wherein the plurality of optimized native code templates comprises different versions of templates for resolved classes and unresolved classes.

7. A computer system for implementing a just-in-time compiler, comprising:
a virtual machine configured to execute instructions in an intermediate language;
an optimizing static compiler adapted for runtime use with the virtual machine;
a plurality of high-level code templates in a high-level programming language,
wherein the high-level programming language is designed for compilation to the intermediate language, and
wherein each high-level code template selected from the plurality of high-level code templates represents an instruction in the intermediate language; and
a software development environment configured to:
compile the plurality of high-level code templates to native code to obtain a plurality of optimized native code templates prior to runtime;
mark a constant in an optimized native code template selected from the plurality of optimized native code templates with an annotation, wherein the annotation indicates that the constant requires modification by the just-in-time compiler at runtime; and
implement the just-in-time compiler using the plurality of optimized native code templates, wherein the just-in-time compiler is configured to substitute a copy of an optimized native code template selected from the plurality of optimized native code templates when a corresponding instruction in the intermediate language is encountered at runtime.

8. The computer system of claim 7, wherein the software development environment is further configured to:
extend the optimizing static compiler to support a plurality of mapping instructions in the high-level programming language,
wherein the plurality of mapping instruction provides access to native registers and stack manipulation functions, and
wherein a high-level code template selected from the plurality of high-level code templates comprises a mapping instruction selected from the plurality of mapping instructions.

9. The computer system of claim 7, wherein the annotation is associated with an instruction editor, and wherein the just-in-time compiler is further configured to modify the constant, using the instruction editor, at runtime.

10. The computer system of claim 7, wherein the constant is an offset to a field in an object.

11. The computer system of claim 7, wherein the plurality of optimized native code templates comprises different versions of templates for resolved classes and unresolved classes.

12. A system for implementing a just-in-time complier, comprising:
means for obtaining a plurality of high-level code templates in a high-level programming language,
wherein the high-level programming language is designed for compilation to an intermediate language capable of execution by a virtual machine, and
wherein each high-level code template selected from the plurality of high-level code templates represents an instruction in the intermediate language;
means for compiling the plurality of high-level code templates to native code to obtain a plurality of optimized native code templates,
wherein compiling the plurality of high-level code templates is performed, prior to runtime, using an optimizing static compiler designed for runtime use with the virtual machine;
means for marking a constant in an optimized native code template selected from the plurality of optimized native code templates with an annotation, wherein the annotation indicates that the constant requires modification by the just-in-time compiler at runtime; and
means for implementing the just-in-time compiler using the plurality of optimized native code templates, wherein the just-in-time compiler is configured to substitute a copy of an optimized native code template selected from the plurality of optimized native code templates when a corresponding instruction in the intermediate language is encountered at runtime.

13. The system of claim 12, further comprising:
means for extending the optimizing static compiler to support a plurality of mapping instructions in the high-level programming language,
wherein the plurality of mapping instruction provides access to native registers and stack manipulation functions, and
wherein a high-level code template selected from the plurality of high-level code templates comprises a mapping instruction selected from the plurality of mapping instructions.

14. The system of claim 12, wherein the annotation is associated with an instruction editor, and wherein the just-in-time compiler is further configured to modify the constant, using the instruction-editor, at runtime.

15. The system of claim 14, further comprising:
means for encountering the annotation at runtime; and
means for executing the instruction editor based on encountering the annotation, wherein executing the instruction editor comprises modifying the constant based on a runtime context of the constant.

16. The system of claim 12, wherein the constant is one selected from the group consisting of an offset to a field of an object, an index into a virtual method dispatch table, a literal constant, a reference to a runtime representations of a class, and a reference to a statically linked method.

17. The system of claim 12, wherein the plurality of optimized native code templates comprises different versions of templates for resolved classes and unresolved classes.

* * * * *